US011646798B2

(12) United States Patent
Sakai et al.

(10) Patent No.: US 11,646,798 B2
(45) Date of Patent: May 9, 2023

(54) RECEIVING DEVICE AND RECEIVING METHOD

(71) Applicant: FUJITSU OPTICAL COMPONENTS LIMITED, Kawasaki (JP)

(72) Inventors: Yoshio Sakai, Kawasaki (JP); Toshiki Tanaka, Setagaya (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/411,687

(22) Filed: Aug. 25, 2021

(65) Prior Publication Data

US 2022/0109504 A1 Apr. 7, 2022

(30) Foreign Application Priority Data

Oct. 5, 2020 (JP) .............................. JP2020-168252

(51) Int. Cl.
*H04B 10/61* (2013.01)
*H04B 10/50* (2013.01)
(Continued)

(52) U.S. Cl.
CPC ..... *H04B 10/50572* (2013.01); *H01S 3/0057* (2013.01); *H01S 3/06754* (2013.01);
(Continued)

(58) Field of Classification Search
CPC .............. H04B 10/50572; H04B 10/61; H04B 10/614; H04B 10/616; H04B 10/272;
(Continued)

(56) References Cited

U.S. PATENT DOCUMENTS 8,670,680 B2 * 3/2014 Tanaka ............... H04B 10/6161
398/208
9,166,700 B2 * 10/2015 Gripp ................. H04B 10/6161
(Continued)

FOREIGN PATENT DOCUMENTS

| JP | 2014-230162 | 12/2014 |
| JP | 2015-220567 | 12/2015 |
| JP | 2017-152773 | 8/2017 |

OTHER PUBLICATIONS

Mungun-Erdene Ganbold et al., "A Large-Scale Optical Circuit Switch Using Fast Wavelength-Tunable and Bandwidth-Variable Filters", IEEE Photonics Technology Letters, vol. 30, No. 16, Aug. 15, 2018 (4 pp.).

*Primary Examiner* — Dibson J Sanchez
(74) *Attorney, Agent, or Firm* — Staas & Halsey LLP

(57) ABSTRACT

A receiving device includes a light source outputting local oscillation light, a detector detecting intermittent input of a burst light signal by using the local oscillation light, a first converter converting the detected burst optical signal into an electrical analog signal, an amplifier amplifying the analog signal according to a gain, a second converter converting the amplified analog signal into a digital signal, and a setting processor setting the gain of the amplifier and a wavelength of the local oscillation light instructed by a control device when setting a communication line with one of transmitting devices transmitting the burst optical signal, wherein, before setting the communication line, the setting processor switches the wavelength of the local oscillation light according to the burst optical signal transmitted from each of the transmitting devices, adjusts the gain of the amplifier and notifies the control device of the adjusted gain.

15 Claims, 13 Drawing Sheets

US 11,646,798 B2
Page 2

(51) Int. Cl.
*H01S 3/067* (2006.01)
*H04J 14/02* (2006.01)
*H01S 3/00* (2006.01)
*H01S 3/10* (2006.01)
*H04Q 11/00* (2006.01)

(52) U.S. Cl.
CPC ...... *H01S 3/10015* (2013.01); *H04J 14/0221* (2013.01); *H04B 10/61* (2013.01); *H04B 10/614* (2013.01); *H04B 10/616* (2013.01); *H04J 14/02* (2013.01); *H04J 14/0278* (2013.01); *H04Q 11/0001* (2013.01)

(58) Field of Classification Search
CPC ............ H01S 3/0057; H01S 3/06754; H01S 3/10015; H04J 14/0221; H04J 14/0278; H04J 14/02; H04Q 11/0001
USPC ............... 398/182–201, 43–103, 202–214
See application file for complete search history.

(56) References Cited

U.S. PATENT DOCUMENTS

| | | | | |
|---|---|---|---|---|
| 9,363,022 | B2* | 6/2016 | Aoki | H04B 10/6931 |
| 9,647,753 | B1* | 5/2017 | Kurisu | H04J 14/0221 |
| 10,020,879 | B2* | 7/2018 | Saito | H04B 10/572 |
| 10,187,174 | B2* | 1/2019 | Yamauchi | H04B 10/616 |
| 2007/0092256 | A1* | 4/2007 | Nozue | H04J 14/0232 398/72 |
| 2010/0111544 | A1* | 5/2010 | Oda | H04B 10/613 398/204 |
| 2012/0057884 | A1* | 3/2012 | Zhao | H04B 10/69 398/209 |
| 2013/0071109 | A1* | 3/2013 | Khatana | H04B 10/6164 398/116 |
| 2013/0251368 | A1* | 9/2013 | Kim | H04B 10/572 398/58 |
| 2013/0286847 | A1* | 10/2013 | Schmidt | H04B 10/65 398/43 |
| 2013/0322876 | A1* | 12/2013 | Gehrke | H04B 10/07955 398/205 |
| 2013/0343751 | A1* | 12/2013 | Mamyshev | H04B 10/615 398/202 |
| 2014/0010543 | A1* | 1/2014 | Lee | H04B 10/615 398/79 |
| 2014/0023359 | A1* | 1/2014 | Tsubouchi | H04B 10/0799 398/24 |
| 2014/0328588 | A1* | 11/2014 | Sakai | H04B 10/6164 398/140 |
| 2014/0348515 | A1* | 11/2014 | Tsubouchi | H04B 10/614 398/202 |
| 2015/0256266 | A1* | 9/2015 | Duthel | H04B 10/07955 398/202 |
| 2017/0134097 | A1* | 5/2017 | Morie | G01J 1/44 |
| 2018/0198547 | A1* | 7/2018 | Mehrvar | H04B 10/25 |
| 2019/0207702 | A1 | 7/2019 | van Veen et al. | |
| 2020/0382235 | A1* | 12/2020 | Matsuda | H04J 14/06 |
| 2021/0409124 | A1* | 12/2021 | Murakami | H04B 10/615 |

* cited by examiner

FIG. 10

| SETTING VOLTAGE VALUE (V) | GAIN |
|---|---|
| 0.0 | 1 |
| 0.1 | 2 |
| 0.2 | 3 |
| 0.3 | 4 |
| 0.4 | 5 |
| 0.5 | 6 |
| 0.6 | 7 |
| 0.7 | 8 |
| 0.8 | 9 |
| 0.9 | 10 |
| 1.0 | 11 |
| 1.1 | 12 |
| 1.2 | 13 |
| 1.3 | 14 |
| 1.4 | 15 |
| 1.5 | 16 |
| 1.6 | 17 |
| 1.7 | 18 |
| 1.8 | 19 |
| 1.9 | 20 |
| ... | ... |

Pc (row 1.0 / 11)
Pd (row 1.8 / 19)

RECEIVING DEVICE AND RECEIVING METHOD

CROSS-REFERENCE TO RELATED APPLICATION

This application is based upon and claims the benefit of priority of the prior Japanese Patent Application No. 2020-168252 filed on Oct. 5, 2020, the entire contents of which are incorporated herein by reference.

FIELD

A certain aspect of the embodiments is related to a receiving device and a receiving method.

BACKGROUND

Each rack installed in the data center is equipped with, for example, a plurality of servers and a ToR (Top of Rack) switch. The ToR switch stores data transmitted from a server in the same rack into an optical signal having a predetermined wavelength according to a digital coherent transmission system, and transmits the data to another ToR switch in another rack. The ToR switch in each rack is connected to the another ToR switch in the another rack via a multicast switch, an optical splitter or the like, and can communicate with any ToR switch in the another rack (see, for example, Mungun-Erdene Ganbold et al., "A Large-Scale Optical Circuit Switch Using Fast Wavelength-Tunable and Bandwidth-Variable Filters", IEEE PHOTONICS TECHNOLOGY LETTERS, VOL. 30, NO. 16, Aug. 15, 2018).

The ToR switch intermittently transmits and receives optical signals in accordance with burst traffic between the servers. The intermittent optical signal is referred to as a "burst optical signal" in the following description. With respect to the burst optical signal of the digital coherent transmission system, for example, Japanese Laid-open Patent Publications No. 2014-230162 discloses a technique of receiving the burst optical signal in a PON (Passive Optical Network) using the digital coherent transmission system.

SUMMARY

According to an aspect of the present disclosure, there is provided a receiving device including: a light source configured to output local oscillation light; a detector configured to detect intermittent input of a burst light signal by using the local oscillation light; a first converter configured to convert the burst optical signal detected by the detector into an electrical analog signal; an amplifier configured to amplify the analog signal according to a gain; a second converter configured to convert the analog signal amplified by the amplifier into a digital signal; and a setting processor configured to set the gain of the amplifier and a wavelength of the local oscillation light instructed by a control device when setting a communication line with one of a plurality of transmitting devices, each of the transmitting devices transmitting the burst optical signal; wherein, before setting the communication line, the setting processor switches the wavelength of the local oscillation light according to the burst optical signal transmitted from each of the transmitting devices which the control device selects sequentially from the transmitting devices, adjusts the gain of the amplifier and notifies the control device of the adjusted gain.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a diagram illustrating an example of a correspondence relationship between a setting voltage value and the gain of the TIA;

DESCRIPTION OF EMBODIMENTS

The ToR switch detects the burst optical signal by local oscillation light having the same wavelength as the burst optical signal, and converts it into an electrical analog signal by photoelectric conversion. In addition, the ToR switch amplifies the analog signal with a TIA (Trans Impedance Amplifier) and converts it to a digital signal with an AD converter (Analog-to-Digital Converter) to compensate for the degradation caused by the burst optical signal in the transmission line, for example.

If the amplitude of the analog signal after amplification is an inappropriate value, the AD converter cannot provide sufficient resolution, which may cause code errors in, for example, the degradation compensation process and the demodulation process of multi-value modulation system with a large modulation multi-value. Since the power of the burst optical signal differs depending on a wavelength and a transmission path of the burst optical signal, the ToR switch controls the amplitude to an appropriate value by feedback control of a gain of the TIA, for example, using AGC (Automatic Gain Control).

However, according to the feedback control, the gain increases in a no-signal period that exists between the burst optical signals, and it takes a predetermined time (e.g., 1

(msec)) for the gain to converge to a target value during the input of the burst optical signal. Therefore, the ToR switch cannot receive the burst optical signal normally until the gain converges, and hence it is necessary to add redundant data to the beginning of the burst optical signal for the required time, which reduces a transmission efficiency.

In contrast, if the gain of the TIA is set in advance to a predetermined value according to the wavelength of the burst optical signal without, using the feedback control such as AGC, the amplitude with an appropriate value can be obtained without the need for the redundant data.

However, since the wavelength and the transmission path of the burst optical signal differ depending on the ToR switch which is a transmission source of the burst optical signal, it is difficult to set the gain of the TIA to a fixed value.

Therefore, it is an object of the present disclosure to provide a receiving device and a receiving method capable of suppressing a decrease in transmission efficiency of the burst optical signal regardless of the wavelength and the transmission path of the burst optical signal.

(Configuration of Transmission System)

Figure 1:
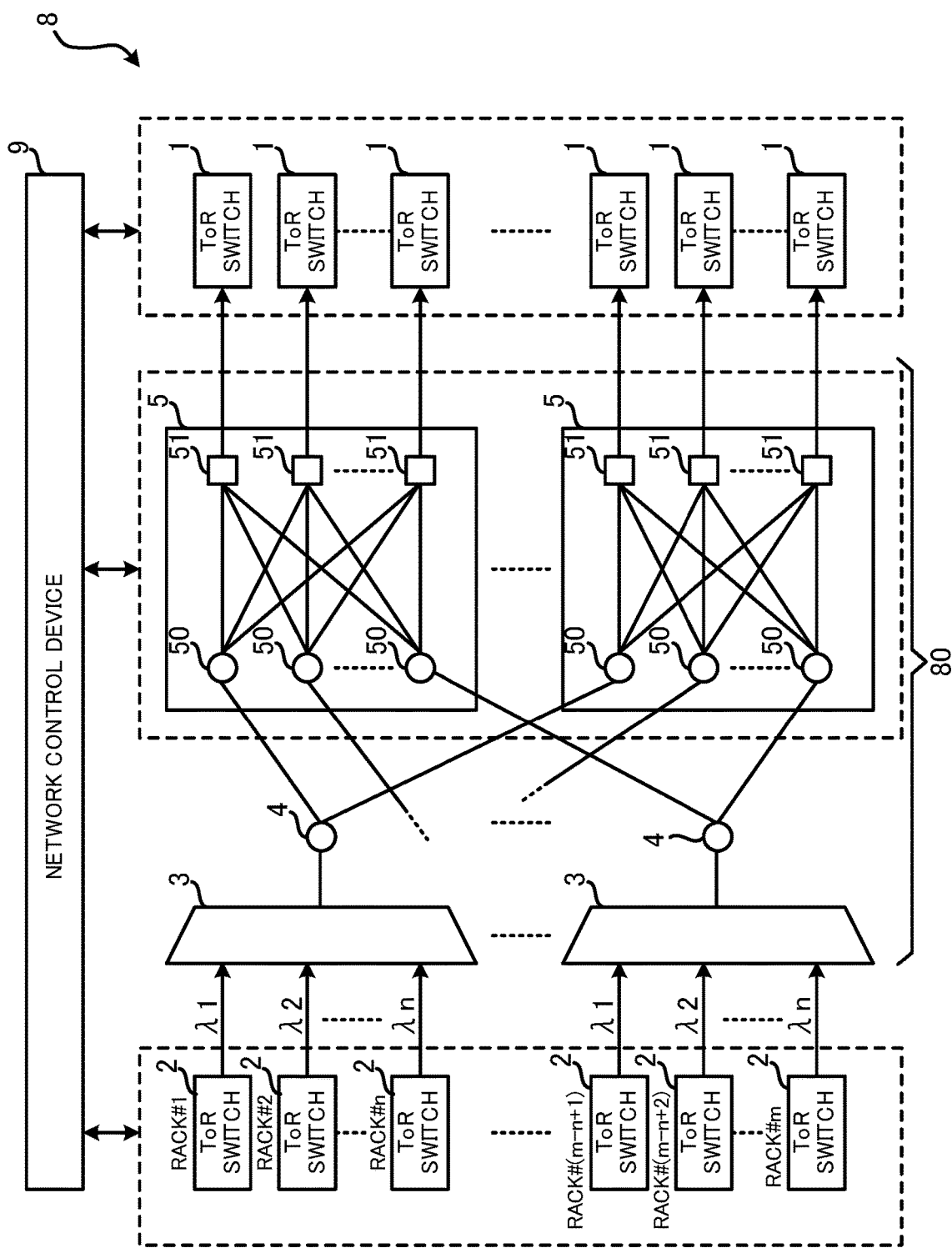
FIG. 1 is a block diagram illustrating an example of a transmission system.

FIG. 1 is a block diagram illustrating an example of a transmission system 8. The transmission system 8 includes a plurality of receiving-side ToR switches 1, a plurality of transmitting-side ToR switches 2, a transmission line 80, and a network control device 9. The transmitting-side ToR switches 2 are connected to the receiving-side ToR switches 1 via the transmission line 80. Further, the network control device 9 monitors and controls the transmission system 8.

The transmitting-side ToR switches 2 and the receiving-side ToR switches 1 are provided in racks #1 to #m (m: positive integer) installed in the data center, for example. Here, each of "#1" to "#m" is a rack ID that identifies the rack.

The transmitting-side ToR switch 2 generates an intermittent burst optical signal from the data input from the server mounted in the same rack as the transmitting-side ToR switch 2 and transmits the intermittent burst optical signal. Here, X-polarized component and Y-polarized components of the transmission light of the transmitting-side ToR switch 2 are polarization-multiplexed into the burst optical signal. The transmitting-side ToR switch 2 is an example of a transmitting device.

The receiving-side ToR switch 1 receives the burst optical signal from the transmitting-side ToR switch 2 via the transmission line 80, and transfers the data to a server mounted in the same rack as the receiving-side ToR switch 1. The transmitting-side ToR switch 2 and the receiving-side ToR switch 1 may not be independent communication devices but may be an integrated communication device.

The network control device 9 assigns the wavelength of the burst optical signal to the transmitting-side ToR switch 2 and the receiving-side ToR switch 1 in each of the racks #1 to #m. The network control device 9 assigns wavelengths $\lambda 1$ to $\lambda n$ to the plurality of transmitting-side ToR switches 2 and the plurality of receiving-side ToR switches 1 every n transmitting-side ToR switches 2 and every n receiving-side ToR switches 1.

The transmission line 80 is provided with an optical combiner 3, an optical splitter 4, and a multicast switch 5 every n (n: positive integer, n<m) transmitting-side ToR switches 2 and n receiving-side ToR switches 1. The burst optical signals having wavelengths $\lambda 1$ to $\lambda n$ are input to each optical combiner 3 from n transmitting-side ToR switches 2, respectively. The optical combiner 3 combines the burst optical signals having wavelengths $\lambda 1$ to $\lambda n$ and wavelength-multiplexes them. The wavelength-multiplexed burst optical signal is input to the optical splitter 4.

Each of the optical splitter 4 outputs the wavelength-multiplexed burst optical signals to each of the multicast switch 5. The multicast switch 5 has n optical splitters 50 on the input sides of the burst optical signals and n optical selector switches 51 on the output sides of the burst optical signals. In the multicast switch 5, the burst optical signals branches from each optical splitter 50 to all optical selector switches 51.

The optical selector switch 51 selects one optical splitter 50 from a plurality of optical splitters 50 according to an instruction from the network control device 9, and outputs the burst optical signal input from the selected optical splitter 50 to the receiving-side ToR switch 1. As will be described later, the receiving-side ToR switch 1 receives the burst optical signal having a wavelength corresponding to the wavelength of the local oscillation light from the wavelength-multiplexed burst optical signals.

In this way, the transmission path of the burst optical signal transmitted from each transmitting-side ToR switch 2 is switched by the multi cast switch 5. Therefore, the transmitting-side ToR switch 2 in each of the racks #1 to #m can transmit the burst optical signal to the receiving-side ToR switch 1 in any of the racks #1 to #m.

(Receiving-Side ToR Switch)

Figure 2:
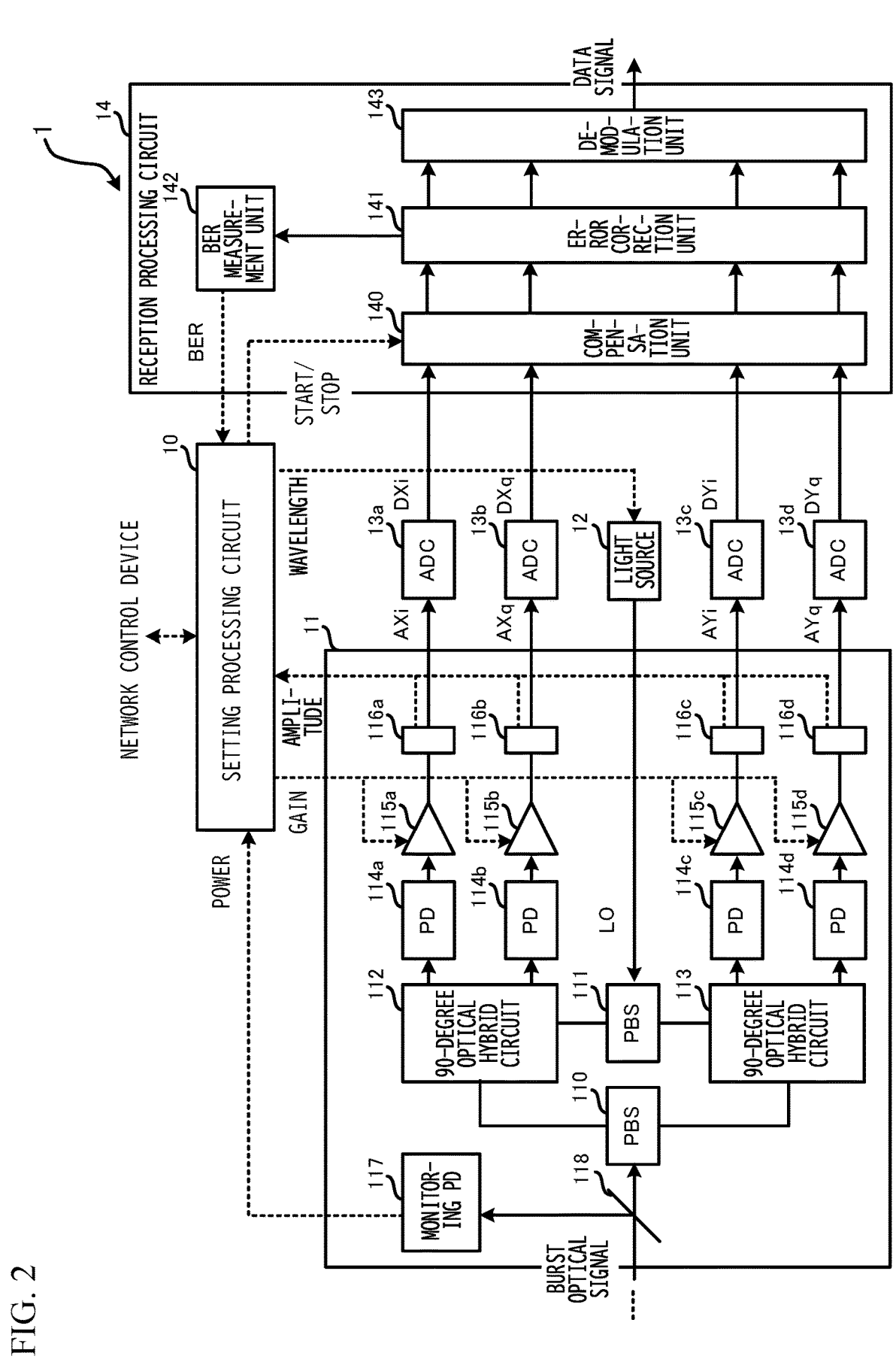
FIG. 2 is a block diagram illustrating an example of a receiving-side ToR switch.

FIG. 2 is a block diagram illustrating an example of the receiving-side ToR switch 1. The receiving-side ToR switch 1 is an example of a receiving device that receives the burst optical signal. The receiving process of the burst optical signal by the receiving-side ToR switch 1 described below is an example of the receiving method. The receiving-side ToR switch 1 includes a setting processing circuit 10, an integrated receiver 11, a light source 12, AD converters (ADCs) 13a to 13d, and a reception processing circuit 14.

As an example, the integrated receiver 11 is installed in the receiving-side ToR switch 1 as a circuit of an intradyne coherent receiver that complies with the OIF (Optical Internetworking Forum) standard. The integrated receiver 11 includes polarizing beam splitters (PBS) 110, 111, 90-degree optical hybrid circuits 112, 113, and balanced photodiodes (PD) 114a to 114d, and transimpedance amplifiers (hereinafter referred to as "TIA") 115a to 115d. Further, the integrated receiver 1 includes peak detectors 116a to 116d, a monitoring photodiode (PD) 117, and a demultiplexer 118.

The burst optical signal is intermittently input from the transmission line 80 to the integrated receiver 11. The burst optical signal is input to the demultiplexer 118 and branches to the monitoring PD 117 and the PBS 110.

The monitoring PD 117 detects the power of the burst optical signal. The monitoring PD 117 notifies the setting processing circuit 10 of the power of the burst optical signal. The monitoring PD 117 is an example of a third measurer that measures the power of the burst optical signal.

The PBS 110 separates the burst optical signal into an X polarization component and a Y polarization component, and outputs them to the 90-degree optical hybrid circuits 112 and 113, respectively. Further, the light source 12 is composed of, for example, a laser diode or the like, and outputs local oscillation light LO having a center wavelength set by the setting processing circuit 10 to the PBS 111. The PBS 111 separates the local oscillation light LO into the X polarization component and the Y polarization component, and outputs them to the 90-degree optical hybrid circuits 112 and 113, respectively.

The 90-degree optical hybrid circuit 112 has a waveguide for interfering the X polarization component of the burst optical signal and the X polarization component of the local oscillation light LO, and detects the X polarization component of the burst optical signal. As a detection result, the 90-degree optical hybrid circuit 112 outputs optical components corresponding to the amplitude and the phase of an in-phase component and a quadrature component to the PDs 114a and 114b, respectively.

The 90-degree optical hybrid circuit 113 has a waveguide for interfering the Y polarization component of the burst optical signal and the Y polarization component of the local oscillation light LO, and detects the Y polarization component of the burst optical signal. As a detection result, the 90-degree optical hybrid circuit 113 outputs optical components corresponding to the amplitude and the phase of the in-phase component and the quadrature component to the PDs 114c and 114d, respectively.

In this way, the 90-degree optical hybrid circuits 112 and 113 detect the burst optical signal by using the local oscillation light LO. Therefore, the integrated receiver 11 can detect and receive the burst optical signal having the wavelength to be received, from the burst optical signals in which the plurality of wavelengths λ1 to λn are wavelength-multiplexed according to the central wavelength of the local oscillation light LO.

The PDs 114a to 114d convert the optical components input from the 90-degree optical hybrid circuits 112, 113 into electrical analog signals AXi, AXq, Ayi and AYq. The PDs 114a to 114d are examples of a first converter. The PDs 114a to 114d output the analog signals AXi, AXq, AYi and AYq to the TIAs 115a to 115d, respectively.

The TIAs 115a to 115d amplify the analog signals AXi, AXq, AYi and AYq according to the gain. The gain of the TIAs 115a to 115d are set by the setting processing circuit 10, respectively. The TIAs 115a to 115d are examples of amplifiers. The TIAs 115a to 115d output the amplified analog signals AXi, AXq, AYi and AYq to the ADCs 13a to 13d, respectively.

The peak detectors 116a to 116d detect the peak voltages of the analog signals AXi, AXq, AYi and AYq to be output to the ADCs 13a to 13d, respectively. The peak detectors 116a to 116d notify the setting processing circuit 10 of the peak voltages. The setting processing circuit 10 calculates the amplitudes of the analog signals AXi, AXq, AYi and AYq from the peak voltages. The peak detectors 116a to 116d are examples of first measures for measuring the amplitudes of the analog signals.

The ADCs 13a to 13d convert the analog signals AXi, AXq, AYi and AYq input from the TIAs 115a to 115d into the digital signals DXi, DXq, DYi and DYq, respectively. The ADCs 13a to 13d exhibit sufficient resolutions as long as the amplitudes of the digital signals DXi, DXq, DYi and DYq are within an appropriate range. The ADCs 13a to 13d are examples of second converters. The ADCs 13a to 13d output the digital signals DXi, DXq, DYi and DYq to the reception processing circuit 14, respectively.

The reception processing circuit 14 is a circuit composed of hardware such as a DST (Digital Signal Processor), an FPGA (Field Programmable Gate Array), or an ASIC (Application Specified Integrated Circuit). The reception processing circuit 14 includes a compensation unit 140, an error correction unit 141, a demodulation unit 143, and a BER (Bit Error Rate) measurement unit 142.

The compensation unit 140 compensates for the deterioration of the signal quality caused in the transmission line 80 with respect to the digital signals DXi, DXq, DYi and DYq. For example, the compensation unit 140 compensates for the polarization mode dispersion generated on the transmission line 80, polarization dependence loss, and waveform distortion of the burst optical signal generated by polarization rotation, based on dynamic parameters. Further, the compensation unit 140 starts and stops compensation for the deterioration of the signal quality for the digital signals DXi, DXq, DYi and DYq in accordance with a compensation start instruction and a compensation stop instruction from the setting processing circuit 10. The compensation unit 140 outputs the digital signals DXi, DXq, DYi and DYq to the error correction unit 141.

The error correction unit 141 corrects errors in the digital signals DXi, DXq, DYi and DYq by, for example, an FEC (Forward Error Correction) function. The error correction unit 141 notifies the BER measurement unit 142 of the number of detected errors in the digital signals DXi, DXq, DYi and DYq. The BER measurement unit 142 measures the BER of the digital signals DXi, DXq, DYi and DYq based on the number of detected errors notified from the error correction unit 141. The BER measurement unit 142 is an example of the second measurer. The error correction unit 141 outputs the error-corrected digital signals DXi, DXq, DYi and DYq to the demodulation unit 143.

The demodulation unit 143 demodulates the digital signals DXi, DXq, DYi and DYq to regenerate the data signal. The demodulation unit 143 uses a demodulation system according to a modulation system of the transmitting-side ToR switch 2. The data signal is output to the server mounted in the same rack as the receiving-side ToR switch 1.

The setting processing circuit 10 is, for example, a circuit including a processor such as a CPU (Central Processing Unit), and a memory, but is not limited to this, and may be a circuit including the FPGA, the ASIC, and the like. The setting processing circuit 10 communicates with the network control device 9 via, for example, a LAN (Local Area Network).

When the setting processing circuit 10 sets the communication line for one of the transmitting-side ToR switches 2, the setting processing circuit 10 sets the gain of TIAs 115a to 115d and the wavelength of the local oscillation light LO instructed by the network control device 9. Before setting the communication line, the setting processing circuit 10 switches the wavelength of the local oscillation light LO according to the burst optical signal transmitted from each transmitting-side ToR switch 2 which the network control device 9 selects sequentially from the plurality of transmitting devices, adjusts the gain of the TIAs 115a to 115d and notifies the network control device 9 of the adjusted gain.

Thereby, before the network control device 9 instructs the receiving-side ToR switch 1 to set the gain of the TIAs 115a to 115d and the wavelength of the local oscillation light LO, the network control device 9 can acquire in advance the wavelength of the burst optical signal of each transmitting-side ToR switch 2 and the adjusted gain of the TIAs 115a to 115d according to the transmission path.

Further, the setting processing circuit 10 detects the presence and absence of input of the burst optical signal by the peak detectors 116a to 116d or the monitoring PD 117 after setting the communication line. The setting processing circuit 10 stops the operation of the compensation unit 140 when the burst optical signal is not input, and operates the compensation unit 140 when the burst optical signal is input.

Thus, when the burst optical signal is input, the compensation unit 140 compensates for the deterioration of the signal quality for the digital signals DXi, DXq, DYi and DYq. When the burst optical signal is not input, the compensation unit 140 does not compensate for the deterioration of the signal quality for the digital signals DXi, DXq, DYi and DYq. Therefore, when the burst optical signal is not input, it is possible to suppress the detection of an error due to no signal in the compensation process of the compensation unit 140.

(Network Control Device)

Figure 3:
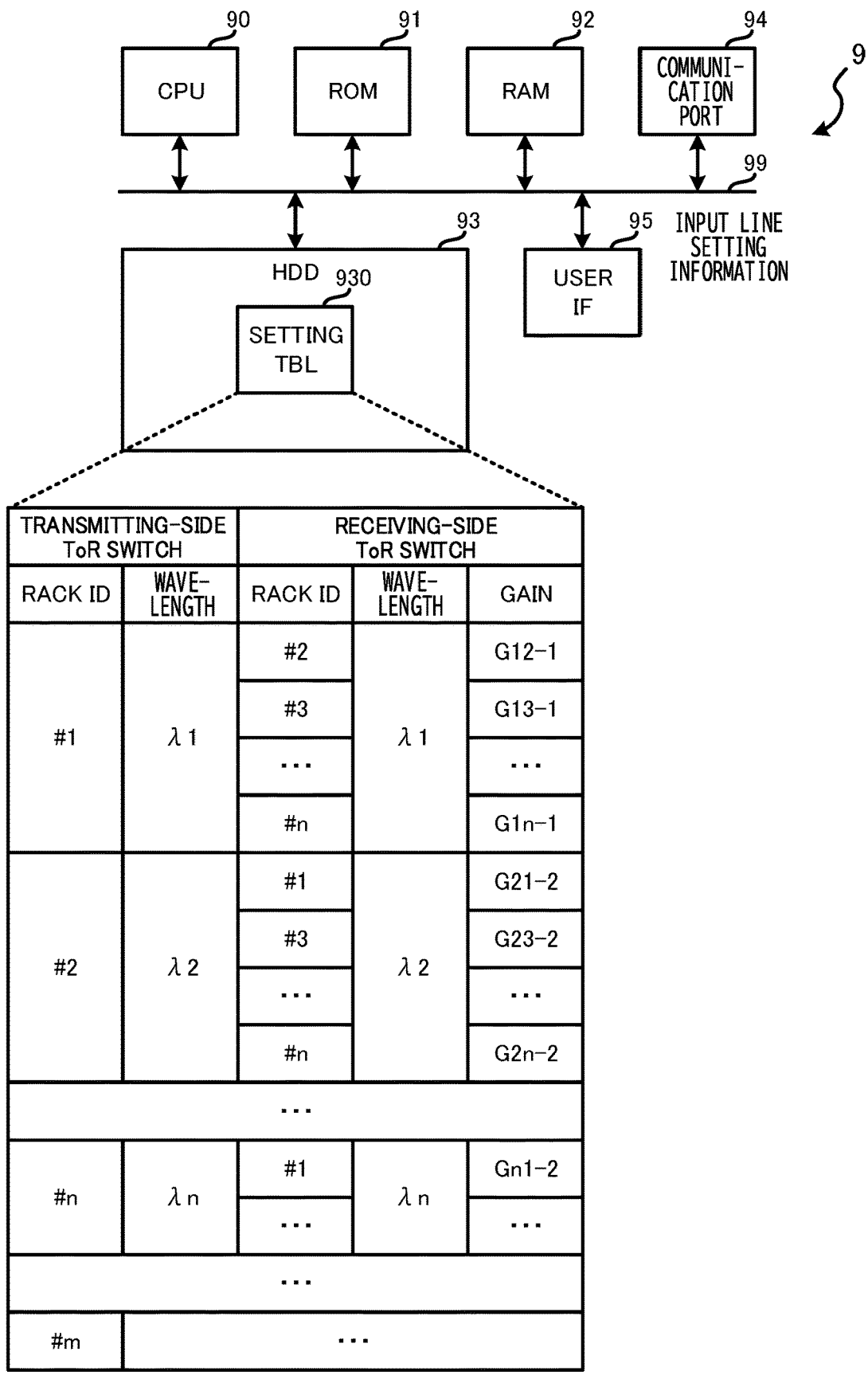
FIG. 3 is a block diagram illustrating an example of a network control device.

FIG. 3 is a block diagram illustrating an example of the network control device 9. The network control device 9 includes a CPU 90, a ROM (Read Only Memory) 91, a RAM (Random Access Memory) 92, an HDD (Hard Disk Drive) 93, a communication port 94, and a user interface unit (user IF) 95. The CPU 90 is connected to the ROM 91, the RAM 92, the HDD 93, the communication port 94, and the user IF 95 via a bus 99 so that signals can be input and output from each other.

The ROM 91 stores a program for driving the CPU 90. The RAM 92 functions as a working memory of the CPU 90. The communication port 94 processes communication between the CPU 90 and the ToR switches 1 and 2 via, for example, an unillustrated LAN (Local Area Network). The user IF 95 is connected to, for example, a terminal device (not illustrated) for an administrator of the transmission system 8 and outputs line setting information input from the terminal device to the CPU 90 via the bus 99. The user IF 95 is composed of, for example, the ASIC or the FPGA.

A setting table (setting TBL) 930 is stored in the HDD 93. The setting TBL 930 may be stored in the non-volatile memory instead of the HDD 93.

The rack ID and wavelength of the burst optical signal in the transmitting-side ToR switch 2, and the rack ID, the wavelength of the burst optical signal and the gain of the TIAs 115a to 115d in the receiving-side ToR switch 1 are registered in the setting TBL 930. The CPU 90 sequentially instructs each transmitting-side ToR switch 2 and each receiving-side ToR switch 1 to execute an adjustment mode setting via the communication port 94.

The transmitting-side ToR switch 2 sets the wavelength of the burst optical signal according to the instruction of the adjustment mode setting. The receiving-side ToR switch 1 sets the wavelength of the burst optical signal, that is, the wavelength of the local oscillation light and the gain of the TIAs 115a to 115d according to the instruction of the adjustment mode setting, and notifies the network control device 9 of the gain.

The CPU 90 can register the gain of the TIAs 115a to 115d of the receiving-side ToR switch 1 corresponding to the wavelength of the burst optical signal of each transmitting-side ToR switch 2 into the setting TBL 930 prior to the setting of the gain during operation. At the time of the adjustment mode setting, the transmitting-side ToR switch 2 may transmit a continuous optical signal instead of the burst optical signal.

For example, when the wavelength of the burst optical signal of the transmitting-side ToR switch 2 in the rack ID "#1" is λ1, the gain of the TIAs 115a to 115d of the receiving-side ToR switch 1 in the rack ID "#2" is G12-1, and the gain of the TIAs 115a to 115d of the receiving-side ToR switch 1 in the rack ID "#3" is G13-1. Further, when the wavelength of the burst optical signal of the transmitting-side ToR switch 2 in the rack ID "#2" is the gain of the TIAs 115a to 115d of the receiving-side ToR switch 1 in the rack ID "#1" is G21-2, and the gain of the TIAs 115a to 115d of the receiving-side ToR switch 1 in the rack ID "#3" is G23-2. When the optimal gains for the in-phase component and the quadrature component of the X polarization and the Y polarization are different from each other, the CPU 90 can also register the gains G12-1-XI, G12-1-XQ, G12-1-YI and G12-1-YQ every TIAs 115a to 115d in the setting TBL 930, respectively.

In this way, the gain of the TIAs 115a to 115d corresponding to the wavelength of the burst optical signal assigned to each transmitting-side ToR switch 2 is registered in the setting TBL 930 for each receiving-side ToR switch 1 in each other rack. Therefore, the network control device 9 can instruct the receiving-side ToR switch 1 on the gain setting according to the transmission path and the wavelength of the burst optical signal determined by the combination of the transmitting-side ToR switch 2 and the receiving-side ToR switch 1.

(Operation of Network Control Device)

Figure 4:
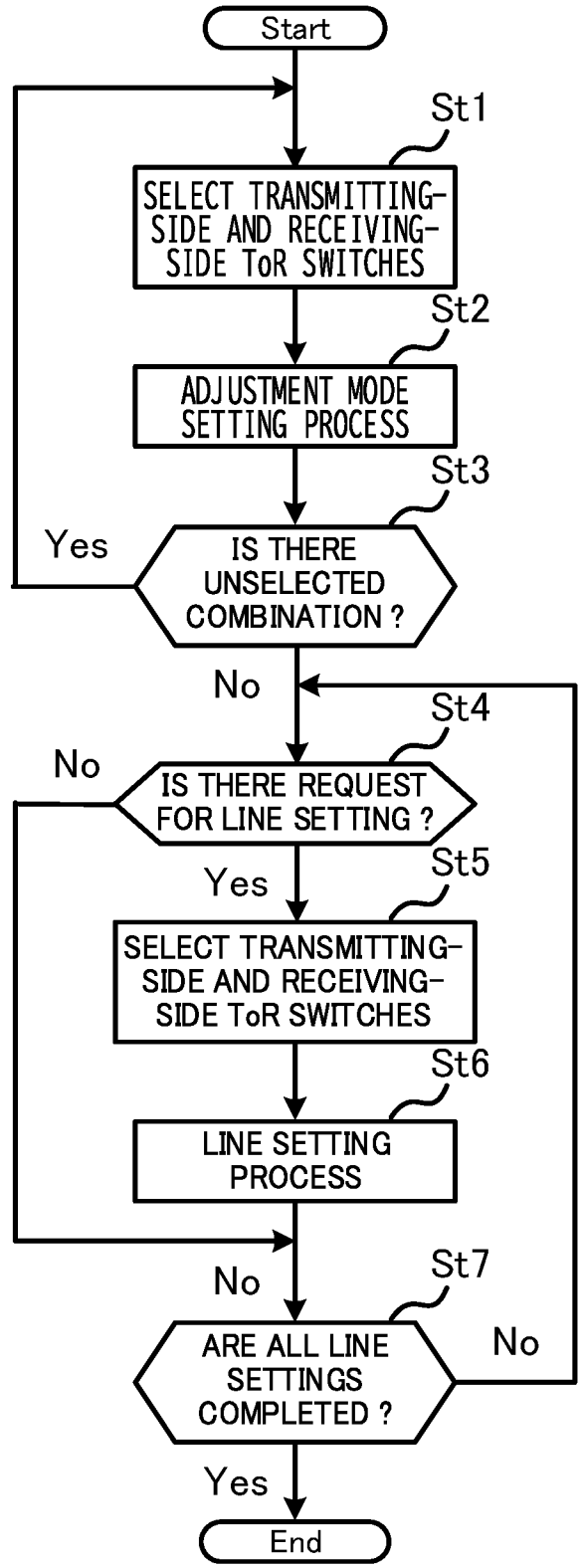
FIG. 4 is a flowchart illustrating an example of the operation of the network control device.

FIG. 4 is a flowchart illustrating an example of the operation of the network control device 9. The CPU 90 selects the combination of the transmitting-side ToR switch 2 and the receiving-side ToR switch 1 (Step St1).

Next, the CPU 90 executes an adjustment mode setting process to the transmitting-side ToR switch 2 and the receiving-side ToR switch 1 (Step St2). In the adjustment mode setting process, the CPU 90 sets the same wavelength to the transmitting-side ToR switch 2 and the receiving-side ToR switch 1, and acquires the adjusted gain of the TIAs 115a to 115d from the receiving-side ToR switch 1 and registers it in the setting TBL 930, as described below.

Next, the CPU 90 determines whether there is an unselected combination of the transmitting-side ToR switch 2 and the receiving-side ToR switch 1 (Step St3). When there is still the unselected combinations (Yes in step St3), each process of step St1 and the subsequent steps is executed again.

When there is not the unselected combination (No in step St3), the CPU 90 determines whether a request for line setting is received from the user IF 95 (step St4). In the request for line setting, the combination of the transmitting-side ToR switch 2 and the receiving-side ToR switch 1 to open the communication line is specified by, for example, the rack ID.

When the CPU 90 receives the request for line setting (Yes in Step St4), it selects the respective rack IDs of the transmitting-side ToR switch 2 and the receiving-side ToR switch 1 to open the communication line from the setting TBL 930 (Step St5). The CPU 90 executes a line setting process for the transmitting-side ToR switch 2 and the receiving-side ToR switch 1 corresponding to the selected rack IDs (Step St6).

In the line setting process, the CPU 90 instructs the transmitting-side ToR switch 2 to set the wavelength of the burst optical signal based on the setting TBL 930, and instructs the receiving-side ToR switch 1 to set the wavelength of the burst optical signal (wavelength of the local oscillation light LO) and the gain of the TIAs 115a to 115d, as described below.

Next, the CPU 90 determines whether all line settings are completed (Step St7). When the CPU 90 does not receive the request for line setting (No in Step St4), the process in Step St7 is also executed.

When there is still an unset line setting (No in step St7), the CPU 90 executes the process of step St4 again. When all line settings are completed (Yes in step St7), the CPU 90 terminates the process. In this way, the network control device 9 operates.

(Adjustment Mode Setting Process)

Figure 5:
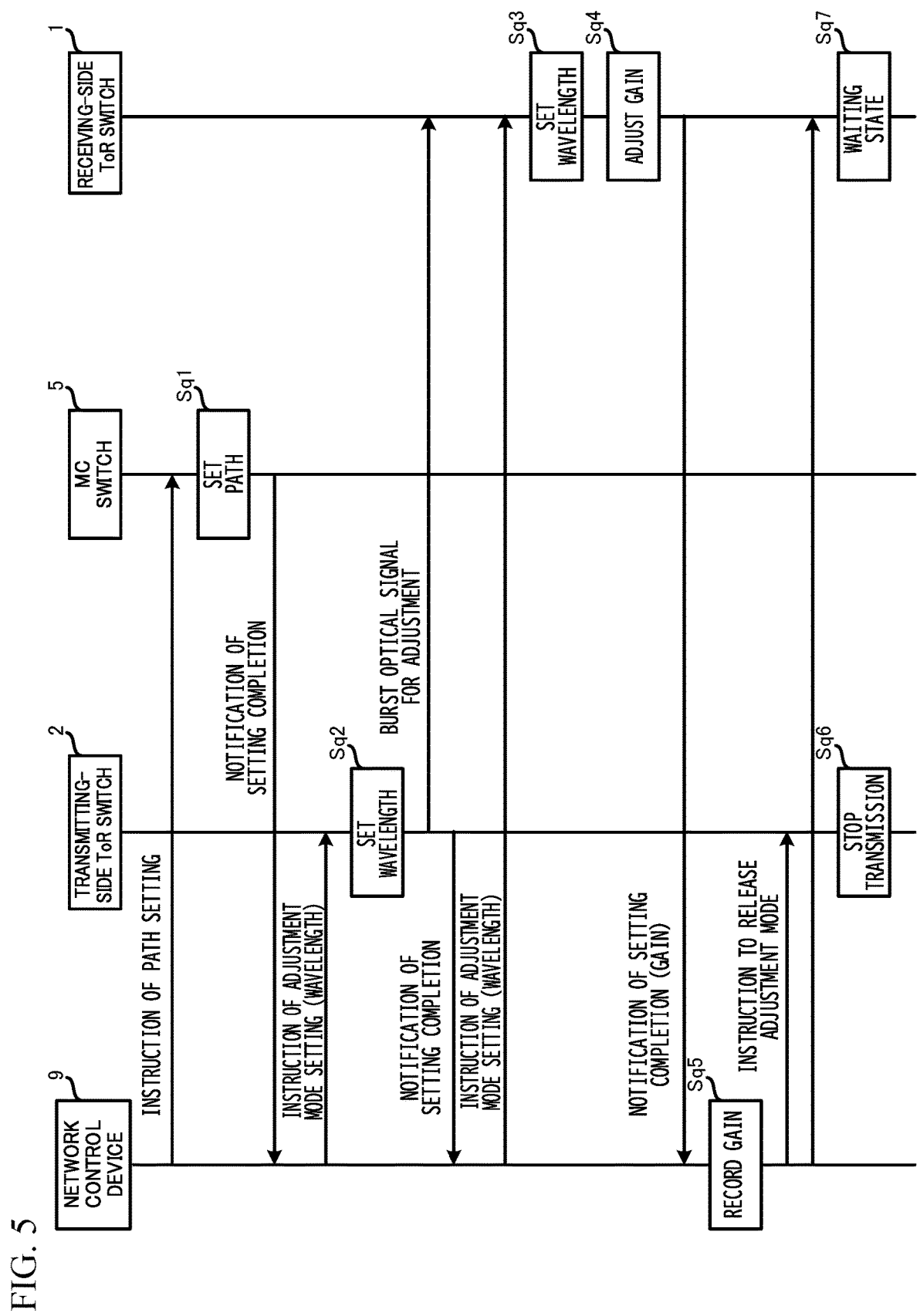
FIG. 5 is a sequence diagram illustrating an example of an adjustment mode setting process.

FIG. 5 is a sequence diagram illustrating an example of the adjustment mode setting process. Before the network control device 9 sets the communication line between the transmitting-side ToR switch 2 and the receiving-side ToR switch 1, the network control device 9 executes the adjustment mode setting in order to acquire the gain of the TIAs 115a to 115d according to the path and the wavelength of the burst optical signal. The network control device 9 instructs the multicast switch (MC switch) 5 on the path setting corresponding to the combination of the transmitting-side ToR switch 2 and the receiving-side ToR switch 1 selected in the process of step St1.

The multicast switch 5 sets the optical selector switch 51 according to the instruction for path setting (Sq1). Thereby, the transmission path of the burst optical signal between the transmitting-side ToR switch 2 and the receiving-side ToR switch 1 is set. Next, the multicast switch 5 notifies the network control device 9 that the setting of the transmission path is completed. The notification of the setting completion may be omitted.

Next, the network control device 9 instructs the transmitting-side ToR switch 2 on the adjustment mode setting. The wavelength of the burst optical signal is specified in the instruction for adjustment mode setting.

The transmitting-side ToR switch 2 sets the wavelength of the burst optical signal according to the instruction for adjustment mode setting (Sq2). At this time, the transmitting-side ToR switch 2 sets the wavelength of the light source for transmission (not illustrated) to the wavelength of the burst optical signal, for example. Next, the transmitting-side ToR switch 2 starts transmitting the burst optical signal for adjustment to the receiving-side ToR switch 1. A random pattern such as PRBS (Pseudo-Random Binary Sequence) is inserted in the burst optical signal for adjustment so that the receiving-side ToR switch 1 can adjust the gain with high accuracy.

Next, the transmitting-side ToR switch 2 notifies the network control device 9 of the completion of the adjustment mode setting. The notification of the setting completion may be omitted.

Next, the network control device 9 instructs the receiving-side ToR switch 1 on the adjustment mode setting. The wavelength of the burst optical signal which is the same as that of the transmitting-side ToR switch 2 is specified in the instruction for adjustment mode setting.

The receiving-side ToR switch 1 sets the wavelength of the local oscillation light LO according to the instruction for adjustment mode setting (Sq3). Next, the receiving-side ToR switch 1 adjusts the gain of the TIAs 115a to 115d according to the instruction for adjustment mode setting (Sq4). An adjustment method of the gain will be described later.

Next, the receiving-side ToR switch 1 notifies the network control device 9 of the completion of the adjustment mode setting. The notification of the completion of the adjustment mode setting includes the adjusted gain. When the gain adjustment fails, the receiving-side ToR switch 1 notifies the network control device 9 of the abnormality by notifying the completion of the adjustment mode setting. The receiving-side ToR switch 1 may also notify the network control device 9 of parameters such as a wavelength dispersion compensation amount used by the compensation unit 140 in a compensation process of the signal quality together with the completion of the adjustment mode setting.

Next, the network control device 9 acquires the adjusted gain from the notification of the completion of the adjustment mode setting received from the receiving-side ToR switch 1, and registers it in the setting TBL930 (Sq5).

Next, the network control device 9 instructs the transmitting-side ToR switch 2 and the receiving-side ToR switch 1 to release the adjustment mode. The transmitting-side ToR switch 2 stops the transmission of the burst optical signal for adjustment according to the instruction for releasing the adjustment mode setting (Sq6). The receiving-side ToR switch 1 shifts to a waiting state waiting for a new instruction from the network control device 9 (Sq7). In this way, the adjustment mode setting process is executed.

By repeating the process of step St1 above, the network control device 9 sequentially selects the transmitting-side ToR switch 2 that transmits the burst optical signal to the receiving-side ToR switch 1. Therefore, the setting processing circuit 10 of the receiving-side ToR switch 1 switches the wavelength of the local oscillation light LO as indicated by Sq3 every time the selection of the transmitting-side ToR switch 2 is switched.

In this way, the setting processing circuit 10 switches the wavelength of the local oscillation light LO according to the burst optical signal of each transmitting-side ToR switch 2 selected sequentially by the network control device 9, adjusts the gain of the TIAs 115a to 115d, and notifies the network control device 9 of the adjusted gain. At this time, the setting processing circuit 10 acquires the wavelength of the burst optical signal transmitted from each transmitting-side ToR switch 2 from the network control device 9, and switches the wavelength of the local oscillation light LO according to the wavelength of the burst optical signal. Therefore, the receiving-side ToR switch 1 does not need to store the wavelength of the burst optical signal of the transmitting-side ToR switch 2 in a memory or the like in advance.

(Line Setting Process)

Figure 6:
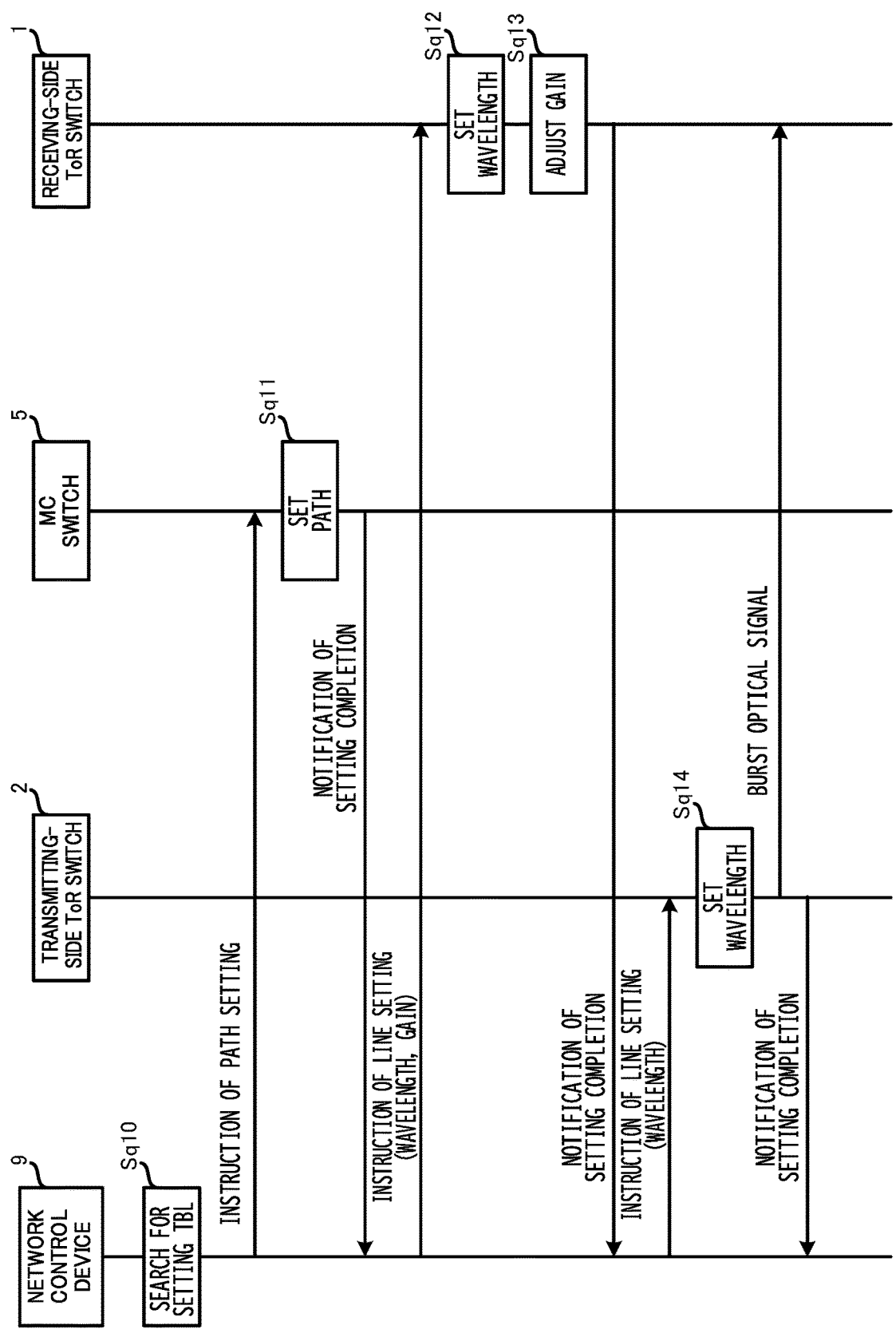
FIG. 6 is a sequence diagram illustrating an example of a line setting process.

FIG. 6 is a sequence diagram illustrating an example of the line setting process. The network control device 9 searches the wavelength ($\lambda 1$ to $\lambda n$) and the gain (G12-1, . . . ) corresponding to the combination of the transmitting-side ToR switch 2 and the receiving-side ToR switch 1 selected in the process of step St5, from the setting TBL 930 (Sq10).

Next, the network control device 9 instructs the multicast switch 5 on the path setting of the transmitting-side ToR switch 2 and the receiving-side ToR switch 1. The multicast switch 5 sets the optical selector switch 51 according to the instruction for path setting (Sq11). Thereby, the transmission path of the burst optical signal between the transmitting-side ToR switch 2 and the receiving-side ToR switch 1 is set. Next, the multicast switch 5 notifies the network control device 9 of the setting completion of the transmission path. The notification of the setting completion may be omitted.

Next, the network control device 9 instructs the receiving-side ToR switch 1 on the line setting. The wavelength and the gain of the receiving-side ToR switch 1 searched from the setting TBL930 are specified in the instruction for line setting.

The receiving-side ToR switch 1 sets the wavelength of the local oscillation light LO (Sq12) and sets the gain of the TIAs 115a to 115d (Sq13) according to the instruction for line setting. Next, the receiving-side ToR switch 1 notifies the network control device 9 of the completion of the line setting. The notification of the setting completion may be omitted. Here, parameters related to the compensation such as a dispersion compensation amount used in the compensation unit 140 may be specified in the instruction for line setting from the network control device 9. The compensation unit 140 performs predetermined setting according to the parameters specified in the instruction for line setting.

Next, the network control device 9 instructs the transmitting-side ToR switch 2 on the line setting. The wavelength of the transmitting-side ToR switch 2 searched from the setting TBL 930 is specified in the instruction for line setting. The transmitting-side ToR switch 2 sets the wavelength of the burst optical signal according to the instruction for line setting (Sq14). When the wavelength of the transmitting-side ToR switch 2 is a fixed value, the instruction for wavelength setting may be omitted. In this case, the transmitting-side ToR switch 2 uses a wavelength adjusted in advance.

Next, the transmitting-side ToR switch 2 starts transmitting the burst optical signal including data input from the server in the same rack to the receiving-side ToR switch 1. Next, the transmitting-side ToR switch 2 notifies the network control device 9 of the completion of the line setting. The notification of the setting completion may be omitted.

In this way, the setting processing circuit 10 sets the gain of the TIAs 115a to 115d and the wavelength of the local oscillation light LO instructed by the network control device 9 when setting the communication line with one of the transmitting-side ToR switches 2. The setting processing circuit 10 notifies the network control device 9 of the gain corresponding to the burst optical signal of each transmitting-side ToR switch 2 by performing the adjustment mode setting described above before the line setting process.

Therefore, the network control device 9 can acquire in advance the respective adjusted gains according to the burst optical signals of the plurality of transmitting-side ToR switches 2 before setting the communication line, and can instruct the setting processing circuit 10 to set the gain according to the transmitting-side TOR switch 2 and the receiving-side ToR switch 1 which are setting targets of the communication line among the acquired gains.

Therefore, the receiving-side ToR switch 1 can set the gain of the TIAs 115a to 115d according to the burst optical signal of the transmitting-side ToR switch 2 which is the setting target of the communication line, so that the amplitudes of the analog signals AXi, AXq, AYi and AYq can be set to appropriate values. Therefore, the burst optical signal does not require redundant data corresponding to the no-signal period as described below.

Figure 7A:
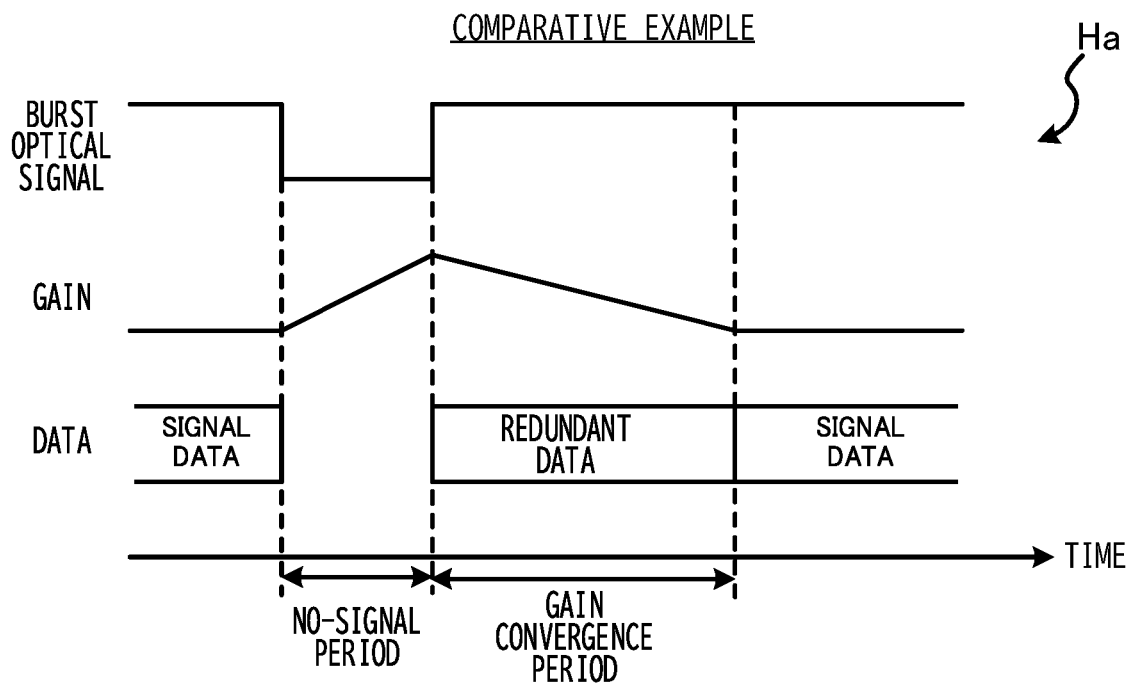
FIG. 7A is a time chart illustrating the burst optical signal, the gain and the data in a comparative example.
Figure 7B:
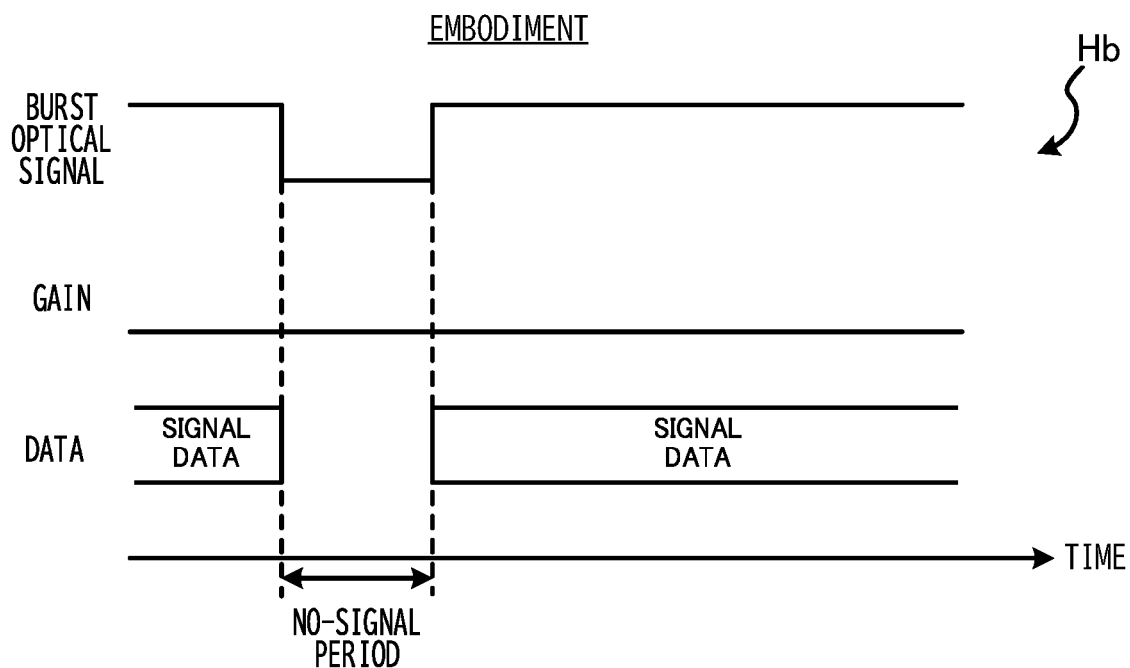
FIG. 7B is a time chart illustrating the burst optical signal, the gain and the data in an embodiment.

FIG. 7A is a time chart illustrating the burst optical signal, the gain and the data in a comparative example. FIG. 7B is a time chart illustrating the burst optical signal, the gain and the data in an embodiment. Here, the data represents data included in the burst optical signal.

A sign Ha in FIG. 7A illustrates the time chart of the comparative example. In the comparative example, the gain of the TIAs 115a to 115d is feedback-controlled by the AGC.

However, according to the feedback control, the gain increases in the no-signal period that exists between the burst optical signals, and it takes a predetermined time (e.g. 1 msec) for the gain to converge to a target value during the input of the burst optical signal. As a result, since the ToR switch cannot normally receive the burst optical signal until the gain converges, it is necessary to add the redundant data different from the normal signal data to the beginning of the burst optical signal for the required time (see "gain convergence period"), which reduces transmission efficiency.

A sign Hb in FIG. 7B illustrates the time chart of the embodiment. In the embodiment, since the gain is set to an appropriate value using the method described above, it is not necessary to add the redundant data to the beginning of the burst optical signal. Therefore, the capacity of the signal data included in the burst optical signal is increased, and the transmission efficiency is improved as compared with the comparative example.

Therefore, the receiving-side ToR switch 1 can suppress a decrease in the transmission efficiency of the burst optical signal regardless of the wavelength and the transmission path of the burst optical signal.

(Adjustment Process of Gain)

Next, an example of the adjustment process of the gain represented by Sq4 in FIG. 5 will be described.

Figure 8:
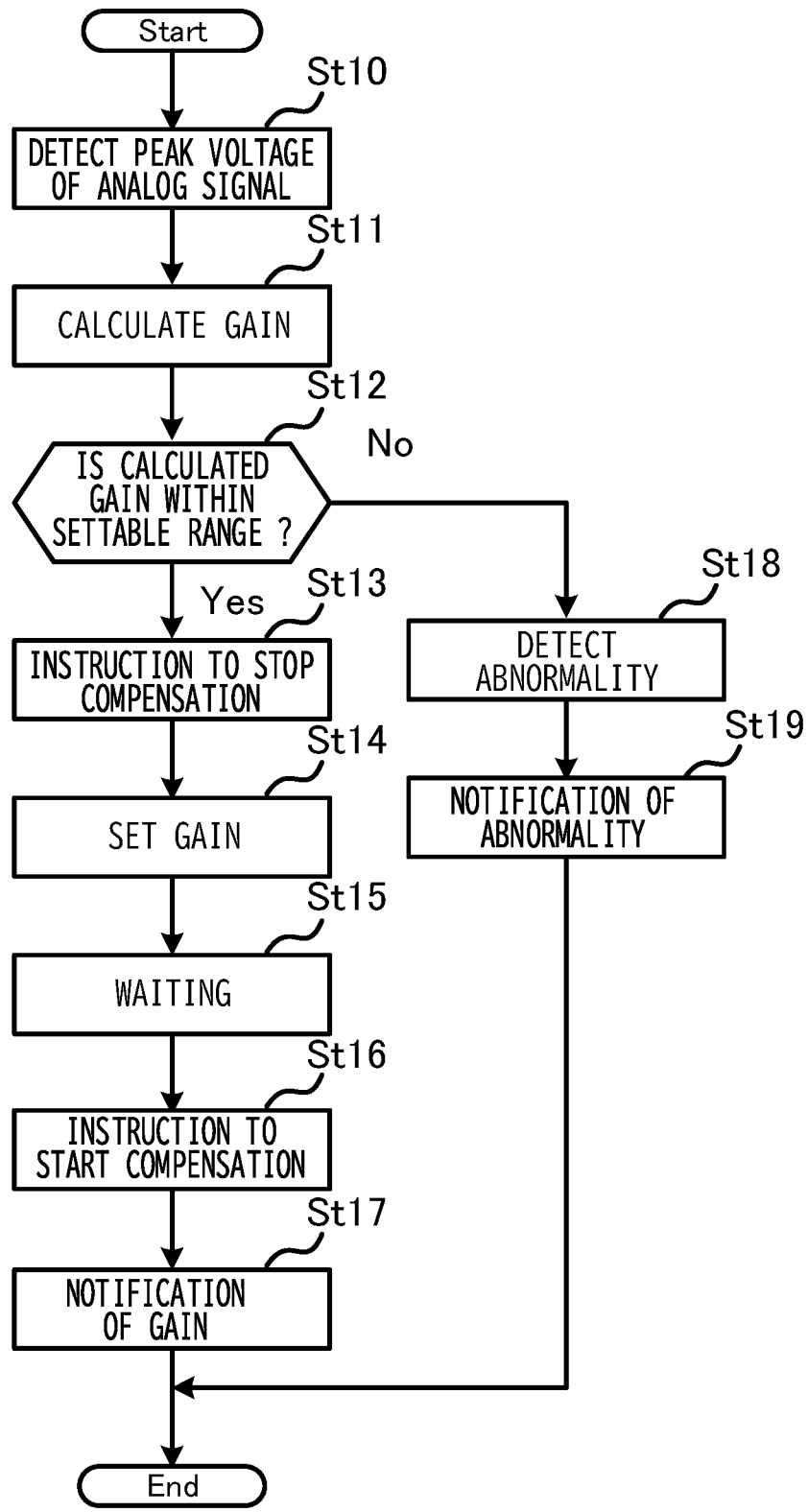
FIG. 8 is a flowchart illustrating an example of an adjustment process of the gain.

FIG. 8 is a flowchart illustrating an example of the adjustment process of the gain. The peak detectors 116a to 116d detect the peak voltages of the analog signals AXi, AXq, AYi and AYq (step St10). Next, the setting processing circuit 10 calculates the gain of the TIAs 115a to 115d from the peak voltages of the analog signals AXi, AXq, AYi and AYq (step St11). A calculation example of the gain is described below.

Figure 9:
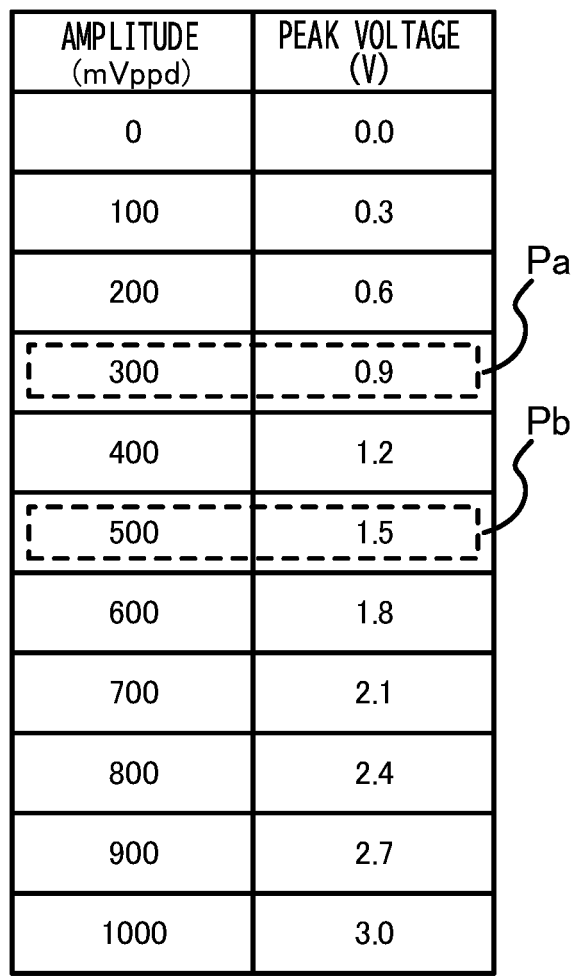
FIG. 9 is a diagram illustrating an example of a correspondence relationship between the amplitude and a peak voltage.

FIG. 9 is a diagram illustrating an example of a correspondence relationship between the amplitude and the peak voltage. The setting processing circuit 10 stores the correspondence relationship between the amplitude (mVppd) and the peak voltage (V) in a storage circuit such as a memory, for example.

When the detected peak voltage is 0.9 (V) as an example, the setting processing circuit 10 acquires 300 (mVppd) as the amplitude corresponding to the peak voltage of 0.9 (V) (code Pa). For example, assuming that the target value of the amplitude of the analog signals AXi, AXq, AYi and AYq input to ADCs 13a to 13d is 500 (mVppd), the setting processing circuit 10 sets the peak voltage corresponding to the target value of the amplitude to 1.5 (V) (code Pb). Therefore, the setting processing circuit 10 calculates that it is necessary to amplify the current peak voltage 1.7 times (=1.5/0.9) in order to set the amplitude as the target value.

FIG. 10 is a diagram illustrating an example of a correspondence relationship between the setting voltage value and the gain of the TIAs 115a to 115d. In this example, the gain of the TIAs 115a to 115d is determined according to the setting voltage value. The setting processing circuit 10 stores the correspondence relationship between the setting voltage value (V) and the gain in the storage circuit such as the memory.

When the setting voltage value in an initial state in the adjustment mode setting is 1.0 (V) as an example, the gain is 11 times (code Pc). Therefore, the setting processing circuit 10 calculates the gain for setting the amplitude to a target value as 19 (=11×1.7). Thereby, the setting processing circuit 10 sets 1.8 (V) to the TIAs 115a to 115d as the setting voltage value for multiplying the gain by 19 (code Pd).

Referring to FIG. 8 again, the setting processing circuit 10 determines whether the calculated gain is within a settable range (step St12). When the gain is out of the settable range (No in step St12), the setting processing circuit 10 detects an abnormality of the receiving-side ToR switch 1 (step St18). Next, the setting processing circuit 10 notifies the network control device 9 of the abnormality (step St19). At this time, the setting processing circuit 10 transmits, for example, a notification signal including an error code (for example, 0x0000) indicating the abnormality to the network control device 9.

Thus, when the gain of the TIAs 115a to 115d cannot be adjusted within a predetermined range, the setting processing circuit 10 notifies the network control device 9 of the abnormality. Therefore, the network control device 9 can notify the administrator of the transmission system 8 of the abnormality of the receiving-side ToR switch 1.

When the gain is within the settable range (Yes in step St12), the setting processing circuit 10 instructs the compensation unit 140 to stop the compensation for the deterioration of the signal quality (step St13). Next, the setting processing circuit 10 sets the gain to the TIAs 115a to 115d

(step St14). The gain is set by the setting voltage value as described above, for example.

In this way, the setting processing circuit 10 adjusts the gain of the TIAs 115a to 115d based on the amplitudes of the analog signals AXi, AXq, AYi and AYq measured by the peak detectors 116a to 116d. Therefore, the setting processing circuit 10 can adjust the gain with high accuracy based on the amplitude. Since the peak detectors 116a to 116d are provided in front of the compensation unit 140, the compensation unit 140 may be in operation or stopped while the peak detectors 116a to 116d are in use. A means for measuring the amplitude is not limited to the peak detectors 116a to 116d, and may be, for example, a measuring circuit provided in the reception processing circuit 14.

The setting processing circuit 10 waits for a predetermined time (step St15), and instructs the compensation unit 140 to start the compensation for the deterioration of the signal quality (step St16).

In this way the setting processing circuit 10 stops the operation of the compensation unit 140 before changing the gain of the TIAs 115a to 115d, waits for a predetermined time, and then starts the operation of the compensation unit 140. Therefore, even if the amplitudes of the analog signals AXi, AXq, AYi and AYq output from the TIAs 115a-115d fluctuate due to a change in the gain setting, the compensation unit 140 can start the compensation process of the signal quality after waiting for the convergence of the amplitudes, thus suppressing the occurrence of errors in the compensation process. If the predetermined waiting time is not required, the compensation unit 140 may omit the waiting process.

Next, the setting processing circuit 10 notifies the network control device 9 of the adjusted gain (step St17). Therefore, the network control device 9 can acquire the adjusted gain for each transmitting-side ToR switch 2 prior to the setting of the communication line. The adjustment process of the gain is performed in this way.

In this example, the setting processing circuit 10 adjusts the gain based on the amplitudes, but the present embodiment is not limited to this.

Figure 11:
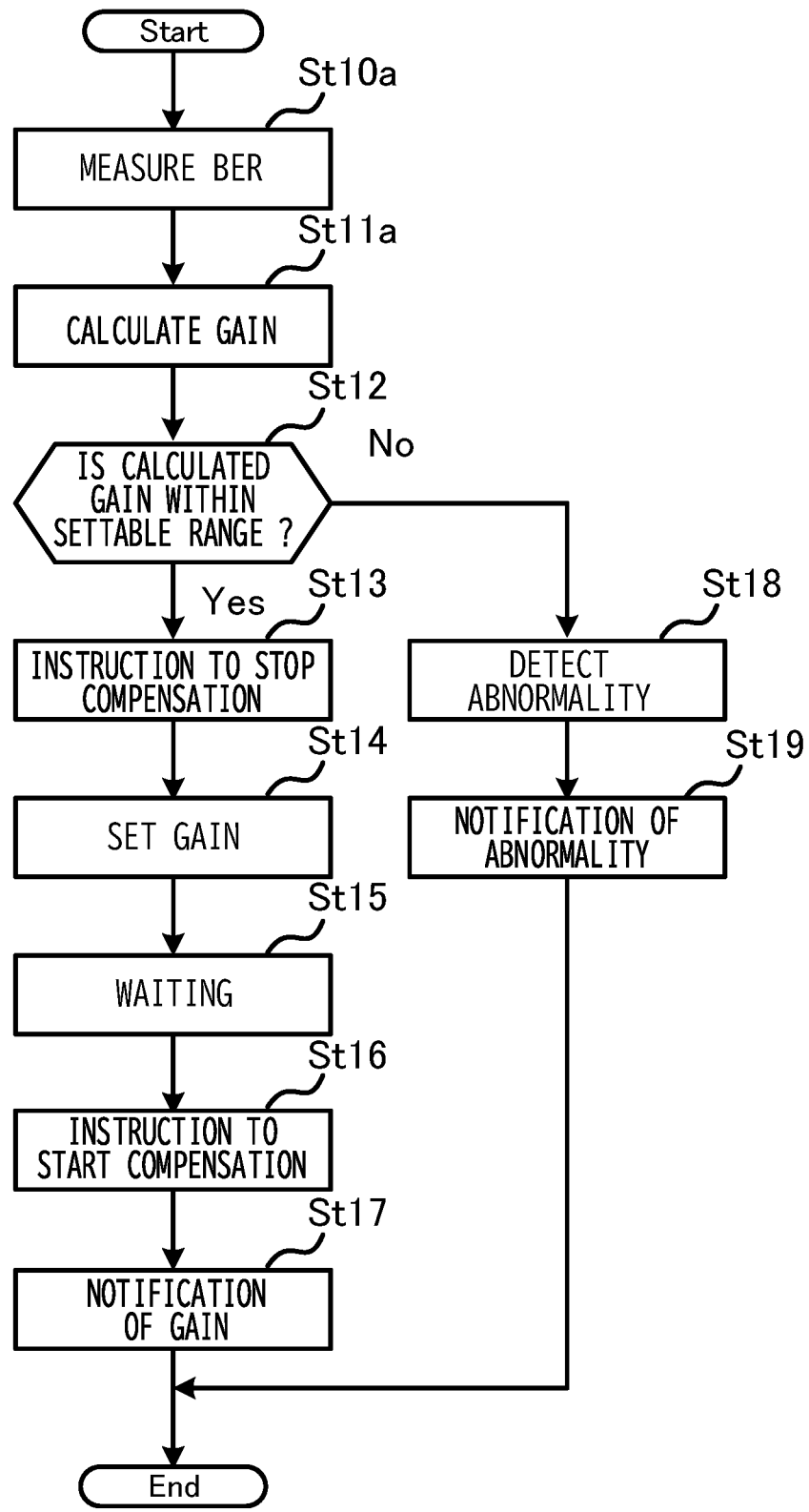
FIG. 11 is a flowchart illustrating another example of the adjustment process of the gain.

FIG. 11 is a flowchart illustrating another example of the adjustment process of the gain. In FIG. 11, the processes common to those in FIG. 8 are designated by the same reference numerals, and the description thereof will be omitted. In this example, the setting processing circuit 10 adjusts the gain based on the BER of the digital signals DXi, DXq, DYi and DYq.

The BER measurement unit 142 measures the BER of the digital signals DXi, DXq, DYi and DYq (step St10a). Next, the setting processing circuit 10 calculates the gain of the TIAs 115a to 115d based on the BER notified from the BER measurement unit 142 (step St11a). Therefore, the setting processing circuit 10 can adjust the gain with high accuracy based on the BER of the digital signals DXi, DXq, DYi and DYq. The BER is an example of an error rate.

Figure 12:
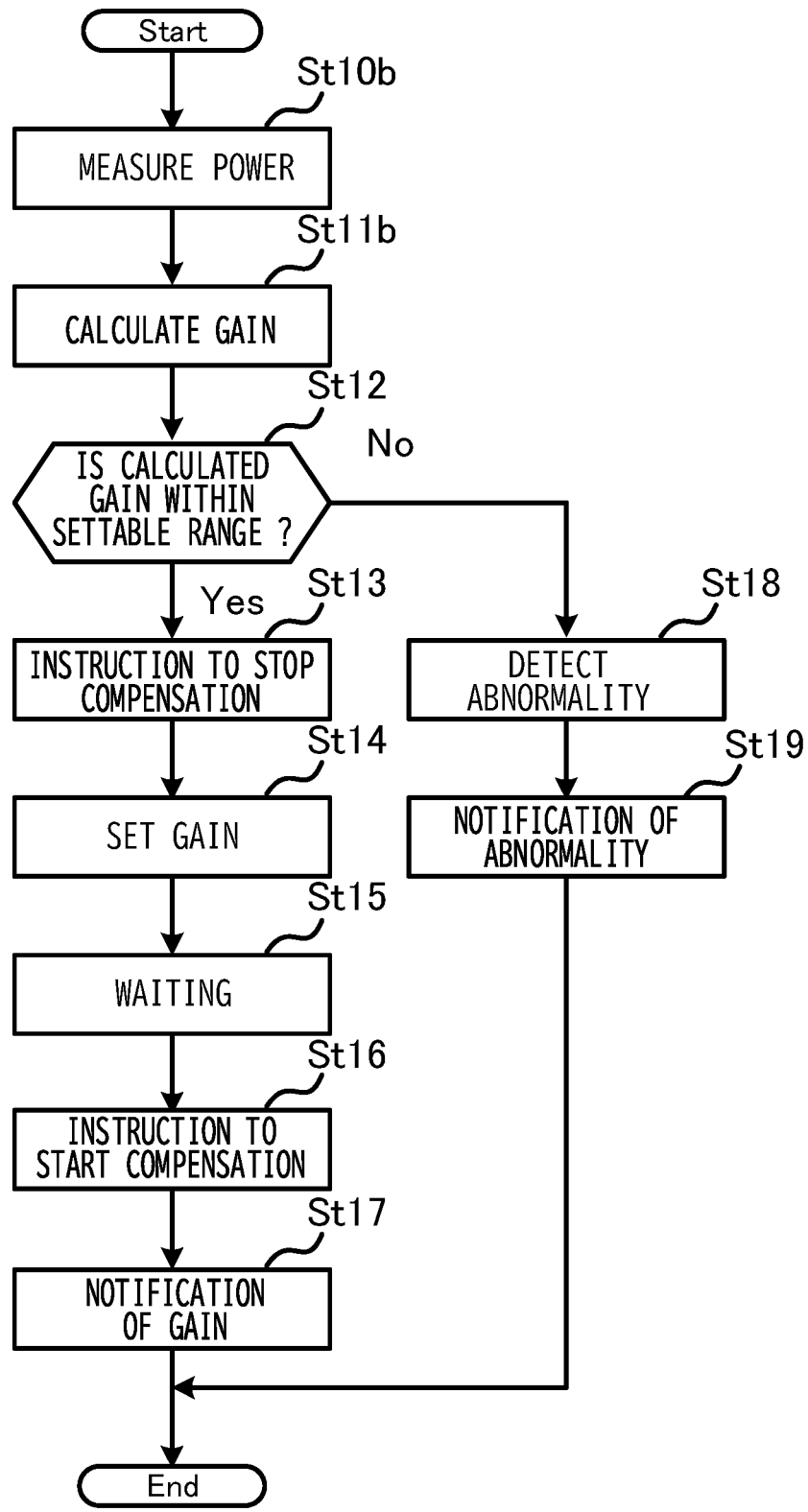
FIG. 12 is a flowchart illustrating still another example of the adjustment process of the gain.

FIG. 12 is a flowchart illustrating still another example of the adjustment process of the gain. In FIG. 12, the processes common to those in FIG. 8 are designated by the same reference numerals, and the description thereof will be omitted. In this example, the setting processing circuit 10 adjusts the gain based on the power of the burst optical signal.

The monitoring PD 117 measures the power of the burst optical signal (step St10b). Next, the setting processing circuit 10 calculates the gain of the TIAs 115a to 115d based on the power of the burst optical signal notified from the monitoring PD 117 (step St11b). Therefore, the setting processing circuit 10 can adjust the gain with high accuracy based on the power of the burst optical signal.

The network control device 9 may generate a database of the power corresponding to the power measured by the monitoring PD 117 for each path between the transmitting-side ToR switch 2 and the receiving-side ToR switch 1, and notify the receiving-side ToR switch 1 of the power according to the path. In this case, the setting processing circuit 10 can calculate the gain based on the power notified from the network control device 9 instead of the power measured by the monitoring PD 117.

(Calculation of Gain)

The network control device 9 acquires the adjusted gain from the receiving-side ToR switch 1 for each transmitting-side ToR switch 2, but the present embodiment is not limited to this. The network control device 9 may estimate the gain corresponding to some receiving-side ToR switches 1 based on the characteristics of the power of the burst optical signal with respect to the wavelength in the transmission line 80.

Figure 13:
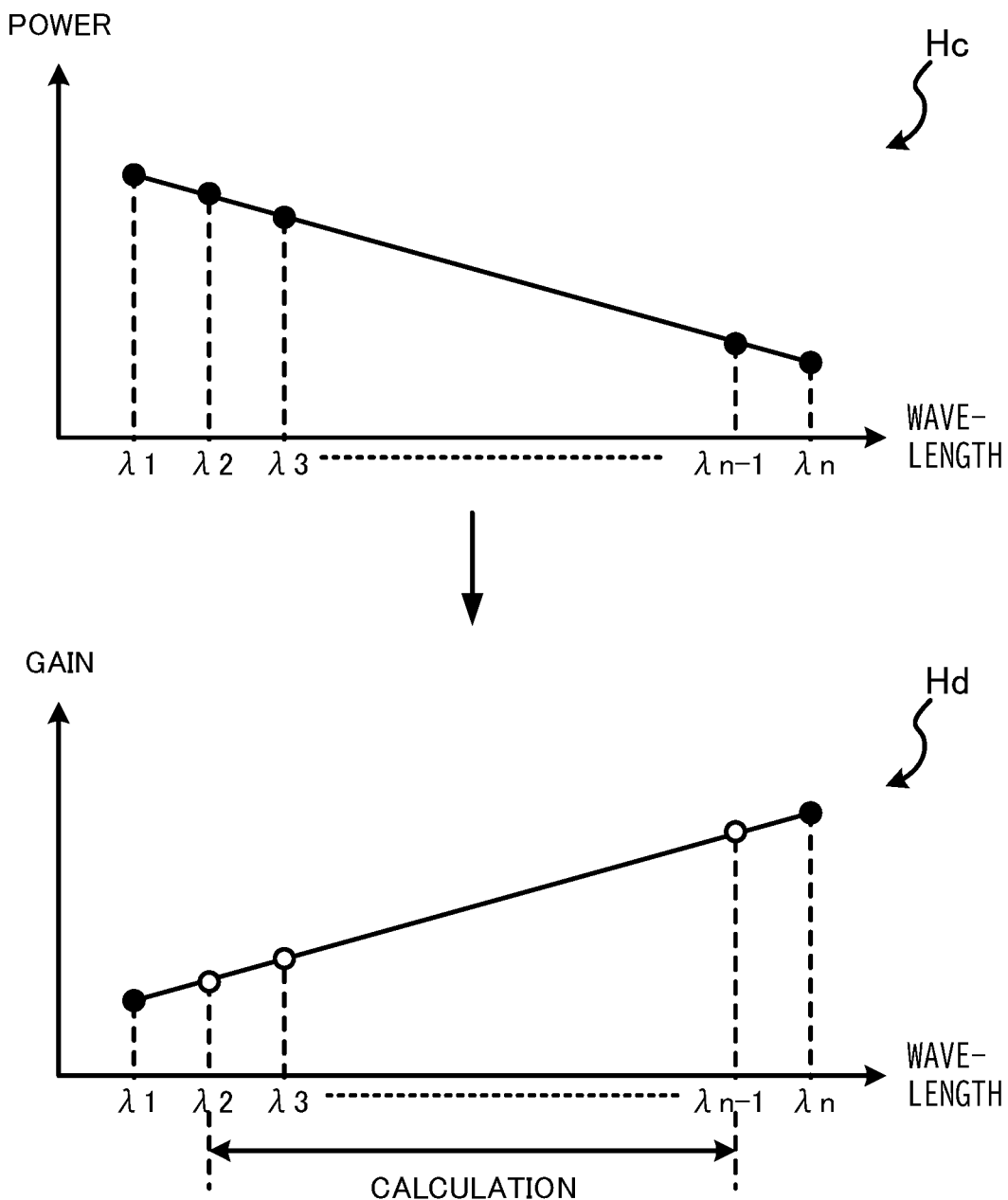
FIG. 13 is a diagram illustrating an example of correspondence relationships of the power and the gain with respect to the wavelength of the burst optical signal.

FIG. 13 is a diagram illustrating an example of the correspondence relationships of the power and the gain with respect to the wavelength of the burst optical signal. A code Hc indicates the correspondence relationship of the power with respect to the wavelength of the burst optical signal in the transmission line 80. In this example, the longer the wavelength, the lower the power of the burst optical signal. The network control device 9 stores in advance the correspondence relationship of the power with respect to the wavelength in the storage means such as the HDD 93.

A code Hd indicates the correspondence relationship of the gain with respect to the wavelength of the burst optical signal. The network control device 9 acquires the gains corresponding to the burst optical signals having wavelengths $\lambda 1$ and $\lambda n$ from the receiving-side ToR switch 1 according to the above method (see black circles). The network control device 9 calculates the gains corresponding to the burst optical signals having other wavelengths $\lambda 2$ to $\lambda n-1$ from the gains in the case of the burst optical signals having the wavelengths $\lambda 1$ and $\lambda n$ based on the correspondence relationship indicated by the code Hd (white circles). In this example, the longer the wavelength, the greater the gain of the burst optical signal.

According to this method, since it is sufficient for the network control device 9 to acquire only the gains corresponding to the wavelengths $\lambda 1$ and $\lambda n$ of the burst optical signals of some of the transmitting-side ToR switches 2 from the receiving-side ToR switches 1, the network control device 9 can omit acquiring the gains corresponding to the burst optical signals having other wavelengths $\lambda 2$ to $\lambda n-1$.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A receiving device comprising:
   a light source configured to output local oscillation light;
   a detector configured to detect intermittent input of a burst optical signal by using the local oscillation light;

a first converter configured to convert the burst optical signal detected by the detector into an electrical analog signal;

an amplifier configured to amplify the electrical analog signal according to a gain;

a second converter configured to convert the electrical analog signal amplified by the amplifier into a digital signal; and a setting processor configured to set the gain of the amplifier and a wavelength of the local oscillation light according to an instruction from a network control device when setting a communication line with one of a plurality of transmitting devices, each of the transmitting devices transmitting the burst optical signal;

wherein, before setting the communication line, the setting processor switches the wavelength of the local oscillation light according to the burst optical signal transmitted from each of the transmitting devices which the network control device selects sequentially from the transmitting devices, adjusts the gain of the amplifier to obtain adjusted gains for the plurality of the transmitting devices and notifies the network control device of the adjusted gains, and the instruction includes a corresponding one of the adjusted gains for the one of the plurality of the transmitting devices.

2. The receiving device as claimed in claim 1, wherein the setting processor acquires, from the network control device, the wavelength of the burst optical signal transmitted from each of the transmitting devices selected by the network control device, and switches the wavelength of the local oscillation light according to the wavelength of the burst optical signal.

3. The receiving device as claimed in claim 1, further comprising:

a first measurer configured to measure an amplitude of the electrical analog signal;

wherein the setting processor adjusts the gain of the amplifier based on the amplitude of the electrical analog signal measured by the first measurer.

4. The receiving device as claimed in claim 1, further comprising:

a second measurer configured to measure an error rate of the digital signal;

wherein the setting processor adjusts the gain of the amplifier based on the error rate of the digital signal measured by the second measurer.

5. The receiving device as claimed in claim 1, further comprising:

a third measurer configured to measure a power of the burst optical signal;

wherein the setting processor adjusts the gain of the amplifier based on the power of the burst optical signal measured by the third measurer.

6. The receiving device as claimed in claim 1, wherein when the setting processor cannot adjust the gain of the amplifier within a predetermined range, the setting processor notifies the network control device of an abnormality.

7. The receiving device as claimed in claim 1, further comprising:

a compensator configured to compensate for deterioration of a signal quality for the digital signal;

wherein the setting processor stops the operation of the compensator before changing the gain of the amplifier, waits for a predetermined time, and then starts the operation of the compensator.

8. A receiving method executed by a receiving device to execute a process, the process comprising:

outputting local oscillation light;

detecting intermittent input of a burst optical signal by using the local oscillation light;

converting the detected burst optical signal into an electrical analog signal;

amplifying the electrical analog signal according to a gain;

converting the amplified electrical analog signal into a digital signal; and setting the gain of amplification of the electrical analog signal and a wavelength of the local oscillation light according to an instruction from a network control device when setting a communication line with one of a plurality of transmitting devices, each of the transmitting devices transmitting the burst optical signal;

wherein, before setting the communication line, the setting switches the wavelength of the local oscillation light according to the burst optical signal transmitted from each of the transmitting devices which the network control device selects sequentially from the transmitting devices, adjusts the gain of the amplification of the electrical analog signal to obtain adjusted gains for the plurality of the transmitting devices and notifies the network control device of the adjusted gains, and the instruction includes a corresponding one of the adjusted gains for the one of the plurality of the transmitting devices.

9. The receiving method as claimed in claim 8, wherein the setting acquires, from the network control device, the wavelength of the burst optical signal transmitted from each of the transmitting devices selected by the network control device, and switches the wavelength of the local oscillation light according to the wavelength of the burst optical signal.

10. The receiving method as claimed in claim 8, further comprising:

measuring an amplitude of the electrical analog signal;

wherein the setting adjusts the gain of the amplification of the electrical analog signal based on the measured amplitude of the electrical analog signal.

11. The receiving method as claimed in claim 8, further comprising:

measuring an error rate of the digital signal;

wherein the setting adjusts the gain of the amplification of the electrical analog signal based on the measured error rate of the digital signal.

12. The receiving method as claimed in claim 8, further comprising:

measuring a power of the burst optical signal;

wherein the setting adjusts the gain of the amplification of the electrical analog signal based on the measured power of the burst optical signal.

13. The receiving method as claimed in claim 8, wherein when the setting cannot adjust the gain of the amplification of the electrical analog signal within a predetermined range, the setting notifies the network control device of an abnormality.

14. The receiving method as claimed in claim 8, further comprising:

compensating for deterioration of a signal quality for the digital signal;

wherein the setting stops compensation operation of the signal quality before changing the gain of the amplification of the electrical analog signal, waits for a predetermined time, and then starts the compensation operation.

15. The receiving method as claimed in claim 14, wherein
the setting determines the presence and absence of input of the burst optical signal after setting the communication line,
the compensating performs compensation for deterioration of the signal quality for
the digital signal when the burst optical signal is input, and
the compensating stops performing compensation for deterioration of the signal quality for the digital signal when the burst optical signal is not input.

* * * * *